Patented Nov. 17, 1953

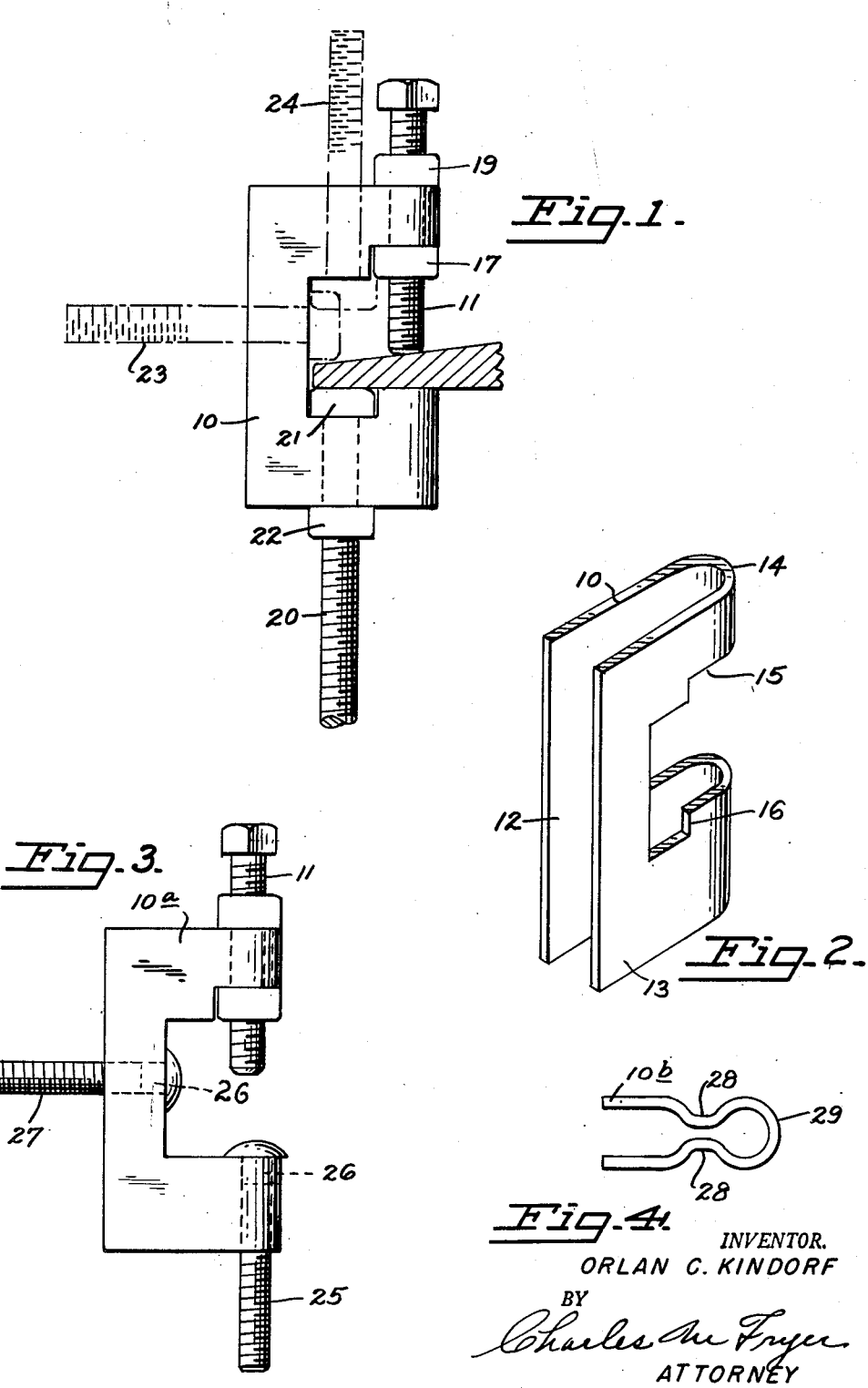

2,659,561

UNITED STATES PATENT OFFICE 2,659,561

C CLAMP

Orlan C. Kindorf, San Francisco, Calif.

Application October 9, 1950, Serial No. 189,152

2 Claims. (Cl. 248—228)

This invention relates to C clamps and particularly to a C clamp of durable, low-cost construction capable of use as a support for pipe, cable or other fixtures suspended from structural beams as well as the many other uses to which C clamps are customarily put.

The conventional C clamp has a body portion made of a forging or malleable casting drilled and tapped at considerable cost for the reception of a clamping screw.

It is the object of the present invention to provide a C clamp in which the body portion is made of a simple piece of steel plate bent and punched and capable of receiving a standard inexpensive nut and bolt in place of the usual clamping screw. A further object of this invention is to provide a C clamp which provides a slotted or open back for the reception of hanger bolts or similar members so that the clamp is readily adaptable to use as a fixture support. Further and more specific objects and advantages of the invention and the manner in which it is carried into practice are made apparent in the following specification wherein reference is made to the accompanying drawings.

In the drawings:

Fig. 1 is a side elevation of a C clamp embodying the present invention shown in place on a beam flange and also shown as supporting a hanger bolt, Fig. 2 is a perspective view of the body portion of the C clamp shown in Fig. 1, Fig. 3 is a view in side elevation of a modified form of the clamp shown in Fig. 1, and Fig. 4 is a plan view of a modified form of the body member shown in Fig. 2.

As illustrated in Figs. 1 and 2, the clamp of the present invention comprises a body member 10 and a clamping screw 11. The body member 10 is formed of a metal plate with its central portion removed as by a punch press operation and with the plate bent substantially in half through the central opening to provide a member which is substantially C-shaped in outline as viewed in Fig. 1. This member is made up of the two side portions 12 and 13, as shown in Fig. 2, joined by the curved part 14 and separated a distance sufficient to receive the clamping screw 11. The central punched out area of the body member may be provided with a relieved portion 15 in one edge and a recess or relieved portion 16 in its opposite edge to receive respectively a nut for the clamping screw and the head of a hanger bolt as will presently appear.

The clamping screw 11 is provided with a nut 17 which fits within the relieved area 15 and is held against rotation by the shoulders of such area. The nut 17 may be welded or otherwise suitably secured to the body member if desired to facilitate handling of the clamp though this is not necessary to its clamping function. The clamping screw 11 is in the form of an inexpensive conventional bolt and may be rotated or advanced through the nut 17 until its end engages the part to be clamped, shown in Fig. 1 as the flange 18 of any conventional structural beam. A lock nut 19 may also be threaded on the bolt or clamping screw 11 and when tightened against the body of the clamp, serves to prevent accidental loosening of the clamping screw.

One advantage of forming the C-shaped body member from a flat plate, as shown, in addition to the low-cost of construction, resides in the fact that the clamp has what is in effect a slotted body member through which hanger bolts or the like may be inserted. Such a hanger bolt is illustrated at 20 in Fig. 1 as having a head 21 received in and held against rotation by the recess 16. A nut 22 may be employed to hold the hanger bolt in place and the extending end of the hanger bolt is threaded to receive any desired type of supporting fixture. Other hanger bolts may be employed or the same hanger bolt may be used in different positions as indicated in dotted lines at 23 and 24 so that the position of the supporting fixture with relation to the clamp may be varied at will. A slightly modified form of the clamp is shown in Fig. 3 of the drawings wherein the body member is shown at 10a and the clamping screw 11 is identical with that shown in Fig. 1. In this modification, a carriage bolt 25 is employed instead of the bolt 20 for supporting a fixture. Carriage bolts are characterized by oval heads and by a squared portion indicated at 26 directly adjacent the head adapted to fit a square or straight walled socket to hold the bolt against rotation and, therefore, in this form of the invention, it is unnecessary to provide the recess 16 for holding the hanger bolt against rotation as the squared portion of the carriage bolt is held between the side portions 12 and 13 of the body member. The carriage bolt will be similarly held against rotation even though it projects from the clamp in a different direction as indicated at 27 in Fig. 3.

The modified form of clamp body member shown in Fig. 4 has side walls 10b corresponding to the side walls 10 in Fig. 2 with depressions formed as at 28 to make a more or less confining cylindrical part at 29 where the set screw 11 passes through the body member. This will prevent tilting or cocking of the set screw and may in some cases permit elimination of the lock nut 19 shown in Fig. 1.

While the C clamp of the present invention has been described herein principally in connection with its use as a pipe or a fixture support, it is to be understood that it is also intended for use in the manner of an ordinary C clamp without the hanger bolts illustrated and that it may also be used with hanger bolts or similar fittings as a temporary or permanent support for various articles other than those herein mentioned.

I claim:

1. A C-clamp having a body member comprising two plates spaced in substantially parallel planes, said plates having registering notches entering through one edge, integral connecting parts between the same edges of the plates at opposite sides of said notches, a clamping screw disposed between the plates adjacent and parallel to one of said connecting parts and adapted to project into the space between said openings, from one side thereof, and a nut threaded on the clamping screw adjacent said side of the openings to enable the clamping screw to be advanced in the direction of the opposite sides of the openings.

2. A C-clamp having a body member comprising two plates spaced in substantially parallel planes, said plates having registering notches entering through one edge, integral connecting parts between the same edges of the plates at opposite sides of said notches, a clamping screw disposed between the plates adjacent and parallel to said connecting part and adapted to project into the space between said openings, from one side thereof, a nut threaded on the clamping screw adjacent said side of the openings to enable the clamping screw to be advanced in the direction of the opposite sides of the openings, and a hanger bolt with a head wider than the space between said plates disposed within said openings and having a threaded shank extending outwardly between said plates.

ORLAN C. KINDORF.

References Cited in the file of this patent

UNITED STATES PATENTS

| Number | Name | Date |
|---|---|---|
| 1,470,642 | Ready | Oct. 16, 1923 |
| 1,737,214 | Brown | Nov. 26, 1929 |
| 1,747,005 | Hawthorne | Feb. 11, 1930 |
| 1,774,878 | Fitzpatrick | Sept. 2, 1930 |
| 1,794,976 | Mueller | Mar. 3, 1931 |
| 2,562,562 | Manasek | July 31, 1951 |